Jan. 6, 1970   J. B. LAWRENCE   3,487,648
METHODS FOR LAYING PIPELINES
Original Filed May 21, 1965   7 Sheets-Sheet 1

INVENTOR
JOSEPH BENTON LAWRENCE

BY *Burns, Doane, Benedict, Swecker & Mathis*

ATTORNEYS

Jan. 6, 1970     J. B. LAWRENCE     3,487,648

METHODS FOR LAYING PIPELINES

Original Filed May 21, 1965     7 Sheets-Sheet 3

INVENTOR
JOSEPH BENTON LAWRENCE

BY Burns, Doane, Benedict,
Swecker & Mathis
ATTORNEYS

INVENTOR
JOSEPH BENTON LAWRENCE

BY Burns, Doane, Benedict, Swecker & Mathis

ATTORNEYS

Jan. 6, 1970  J. B. LAWRENCE  3,487,648
METHODS FOR LAYING PIPELINES
Original Filed May 21, 1965  7 Sheets-Sheet 6

INVENTOR
JOSEPH BENTON LAWRENCE

BY *Burns, Doane, Benedict, Swecker & Mathis*

ATTORNEYS

INVENTOR
JOSEPH BENTON LAWRENCE

ATTORNEYS

United States Patent Office 3,487,648
Patented Jan. 6, 1970

3,487,648
METHODS FOR LAYING PIPELINES
Joseph Benton Lawrence, Houston, Tex., assignor to Brown & Root, Inc., Houston, Tex., a corporation of Texas
Original application May 21, 1965, Ser. No. 457,698, now Patent No. 3,390,532. Divided and this application May 1, 1968, Ser. No. 725,693
The portion of the term of the patent subsequent to July 2, 1985, has been disclaimed
Int. Cl. F16l *1/00;* B65h *17/24*
U.S. Cl. 61—72.3                      7 Claims

ABSTRACT OF THE DISCLOSURE

Method for laying a pipeline on a submerged surface wherein tensioning force is imposed on a portion of a pipeline depending into a body of water. Pipeline compressing means apply the tensioning force such that the peripheral portions of the compressing means engaged with the pipeline which apply the tensioning force are acted upon by motor means so as to tend to move in the direction of the tensioning force. The tensioning force applied by the compressing means remains in effect regardless of the longitudinal direction of movement of the pipeline.

---

This invention relates to methods for laying pipeline on submerged surfaces.

This application is a division of my prior application Ser. No. 457,698, filed May 21, 1965, now United States Patent 3,390,532.

GENERAL BACKGROUND OF INVENTION

Techniques for laying pipelines or other elongate, flexible means on submerged surfaces have long been known. However, techniques heretofore developed have engendered operating difficulties. Many techniques have proven unsafe or have tended to cause pipe damage during pipe laying operations. Other techniques have been so complicated or cumbersome as to not be commercially acceptable.

The successful laying of submerged pipelines, particularly where pipelines are being laid on surfaces submerged up to several hundred feet, requires the satisfying of a number of operating criteria. The technique must be such as to enable operators to maintain continuous control over the lowering of a pipeline through a body of water to a submerged surface. The technique must be safe from the standpoint of both personnel and equipment being utilized. The equipment employed must be structurally rugged, readily transportable, and consistently reliable in operation. The equipment and methods employed should be such as to minimize the number of operating personnel required and facilitate the control of the pipe laying operations from control stations located at a point spaced from operating stations.

In particular, the methods and apparatus employed for laying offshore or submerged pipelines should enable pipelines to be lowered from a floating vessel to a submerged surface without causing pipe kinking or excessive bending and without inducing undue stress in the pipeline. Provision should also be made for accommodating movements of the vessel caused by wave action.

OBJECTS AND SUMMARY OF INVENTION

Recognizing the need for pipeline laying methods and apparatus which are characterized by optimum efficiency, it is an object of the present invention to provide such methods and apparatus which substantially satisfy the criteria heretofore noted.

A basic object of the invention is to provide a pipe laying method entailing the continuous tensioning of a pipeline being lowered from a floating vessel so as to prevent pipe kinking or bending.

It is likewise an object of the invention to provide such a method by means of which a series of tension forces may be applied in a longitudinally spaced fashion to a pipeline being laid on a submerged surface.

Yet another object of the invention is to provide such a method which, in exerting a tension on a pipeline being laid on a submerged surface, tends to stabilize the pipeline such that its longitudinal axis remains in a stabilized position.

A still further object of the invention is to provide such a method by means of which tensioning forces may be continuously applied to a pipeline even though the pipeline may contain depressions or other irregularities in its outer periphery.

It is a particular object of the invention to provide such methods by means of which a vertically flexible ramp may be employed to slidably support a pipeline during its passage from a vessel downwardly to a submerged surface while continuously monitoring the inclination of the ramp and maintaining it straight.

In accomplishing a major object of the invention, a pipe laying method is presented which entails the exertion of tensioning force on a portion of a pipeline depending into a body of water. At the location where the tensioning force is applied, the pipeline is supported by first and second compressing means.

Torque is transmitted to the compressing means by motor means, such that the peripheral portions of the compressing means which engage the pipeline and apply the tensioning force tend to move in the general direction of the tensioning force. The tensioning force is continuously imparted to the pipeline, regardless of the direction of longitudinal movement of the pipeline portion during the pipe laying operation.

As a collateral and independently significant facet of the invention, the pipeline is cradled so as to resist lateral movement tendencies in the area where it is being tensioned. However, the pipeline is supported by the wheels so as to be movable laterally outwardly of the pipeline support defined by the wheels. This enables a pipeline to be moved laterally out of the tensioning device and into a body of water.

Other objects of the invention are accomplished by a unique pipe laying method which entails the adjusting of buoyancy forces acting on a pipe supporting ramp, while concurrently monitoring the position of the ramp with respect to the submerged surface and with respect to a water surface.

DRAWINGS

In describing the invention, reference will be made to preferred embodiments illustrated in the application drawings.

In the drawings:

FIGURE 6 is a schematic, plan view of the FIGURE 15 tensioning mechanism;

FIGURE 17 is a schematic, enlarged, transverse, sectional view of the FIGURE 16 tensioning mechanism as viewed along the section line 17—17;

OVERALL INSTALLATION AND MODE OF OPERATION

Figure 1:
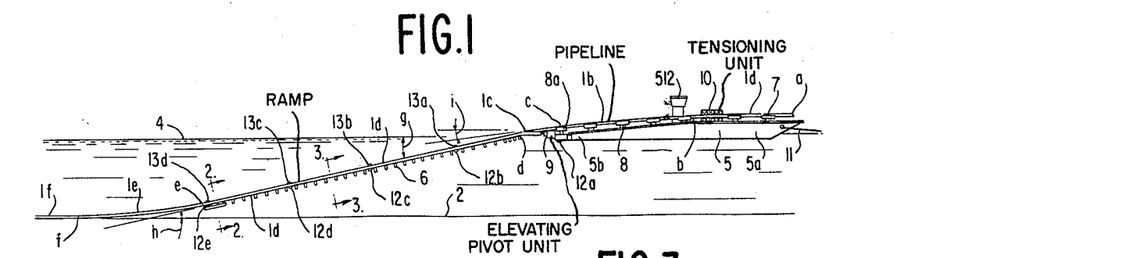
FIGURE 1 is a schematic, enlarged and transverse, elevational view of an overall apparatus employed in laying a pipeline, which apparatus includes a floating vessel and an at least partially submerged ramp pivotally attached thereto.

FIGURE 1 schematically illustrates an arrangement for laying a flexible pipeline 1 on a surface 2 which is submerged beneath a body of water 3. The installation shown in FIGURE 1 is representative of offshore installations where pipelines are being laid such as those in the Gulf of Mexico.

The depth of the water body 3, i.e., the distance between submerged surface 2 and water surface 4, may be as deep as several hundred feet.

The apparatus includes a floating, barge-like vessel 5 and a buoyant and substantially submerged, unitary and vertically flexible ramp 6. The lower end of the ramp 6 is buoyantly supported above the surface 2 as shown. Vessel 5 and ramp 6, in combination, comprise means for buoyantly supporting the upper portion of the pipeline 1.

A plurality of roller-like mechanisms 7 on the vessel 5 slidably support a portion 1a of the pipeline 1 between the points a and b, with the axis of this portion 1a being substantially straight and horizontal. Another plurality of vertically and independently adjustable roller mechanisms 8 slidably support a portion 1b of the pipeline 1 between the points b and c. The rollers 8 are selectively adjusted in elevation such that the pipeline portion 1b is supported with its axis curved. This axis is preferably disposed in an arc of substantially uniform curvature.

A portion of the pipeline 1c may be disposed in unsupported relationship between point 6, i.e., the roller mechanism 8a adjacent the ramp 6, and a point d of contact of the pipeline with this ramp. This pipeline portion 1c, which extends between the points c and d, may be disposed with its longituidnal axis substantially defining a tangential continuation of the curved axis of the portion 1b.

A portion 1d of pipeline 1 is slidably supported on the ramp 6 between the points d and e. The axis of the portion 1d is substantially straight and inclined downwardly from the point d toward the submerged surface 2.

Pipeline portion 1d is thus inclined relative to a horizontal plane and extends downwardly from the point d through the water body 3. Point e, which represents the point of lowermost contact of the ramp 6 with the pipeline 1, is spaced above the submerged surface 2 as illustrated.

At the point e, the lower end of the ramp 6 will exert a buoyant lifting force equal to approximately one-half the weight of the pipeline section 1e.

The lifting forces exerted by the ramp 6 will be sufficient to maintain the predetermined elevation of the point e and to maintain the predetermined inclination of the pipeline section 1d supported on the ramp 6. The ramp 6 will thus exert lifting forces sufficient to buoyantly support the weight of the pipeline section 1d and maintain this positioning of the ramp 6. In other words, the ramp 6 and pipeline portion between points d and f will be characterized, in combination, by generally neutral buoyancy.

An unsupported portion 1e of the pipeline 1 extends from the point e to a point f of contact of the pipeline 1 with the submerged surface. A pipeline portion 1f extends from the point f along the submerged surface.

Pipeline portion 1e is disposed with its axis curved so as to assume a configuration equal to or closely approximating that of an equivalent free length of pipe, tangent to the surface 2 at the point f and having a free end lifted to the elevation of point e.

Straight pipe portion 1d, supported by ramp 6, tangentially merges at opposite ends with pipe portions 1e and 1c respectively, bearing in mind that portion 1c, in essence and for all practical purposes, represents a tangential continuation of portion 1b.

Points f, e and d of pipeline 1 represents points of substantially negligible or zero bending moment in the pipeline.

As will be hereinafter described, the ramp 6 is provided with longitudinally spaced and independently controllable buoyant compartments which comprise means for selectively and remotely varying the inclination of the portion 1d of the pipeline and for independently varying a plurality of lifting forces applied by the ramp 6 longitudinally along the portion 1d. The magnitude of these buoyant lifting forces, which are generated generally laterally and adjacent of the pipeline portion 1d, is controllable from the vessel 5 as will be subsequently described.

A connecting mechanism 9 serves to attach the ramp 6 to the vessel 5 so as to enable pivotal movement of the ramp 6 about a generally horizontal pivot axis. The connecting mechanism 9 is adapted to enable elevation of the upper end of the ramp 6 to be selectively adjusted from the vessel 5 so as to selectively adjust the elevation of the upper end of the pipeline portion 1d.

A tensioning mechanism 10 carried by the vessel 5 comprises means for applying, maintaining, and selectively varying tension to the pipeline portion 1a. This mechanism exerts tension on the pipeline 1 in a direction tending to prevent slidable movement of the pipeline portion 1d generally downwardly along the ramp 6 toward the submerged surface 2.

Anchor lines 11 may radiate outwardly from each corner of the vessel 5, each extending to a submerged anchor not shown. Each anchor line 11 may be engaged with a winding or winch mechanism on the vessel 5. This anchoring arrangement enables the anchor lines 11 to exert tension on the vessel 5 so as to tend to stabilize its position. By appropriately operating the anchor line winches or coiling mechanisms, which are conventional in character and thus not illustrated, the vessel 5 may be caused to move in a desired direction.

In utilizing the apparatus of FIGURE 1, the elevation of the point $d$, the elevation of the point $e$ and the length and inclination of the ramp 6 are selected so as to support the pipeline 1 in a fashion enabling the maximum angle of entry $g$, i.e., the angle between a horizontal plane and the axis of the straight, inclined and submerged pipeline portion $1d$.

These parameters are determined by computing the maximum allowable curvature of the portion $1b$ and the maximum length of the portion $1e$ and elevation of the point $e$, consistent with the predetermined allowable pipeline stresses. The tangent angle $h$ between a horizontal plane and the axis of a line extending tangentially of the pipeline axis from the point $e$ is then compared with the tangent angle $i$, i.e., the angle between a horizontal plane and a line extending tangentially of the axis of the pipeline section $1b$ at the point $c$. The lesser of these two angles is determinative of the angle of inclination of the pipeline section $1d$ supported on the ramp 6. The greater of these angles is adjusted to conform to this inclination, i.e., the curvature of the pipeline portion related to the greater tangent angle is modified so as to obtain a tangent angle equal to the previously noted lesser tangent angle.

In other words, the greater of these tangent angles will then be made equal to the lesser of the tangent angles so as to avoid the creation of excessive stress in the curved pipeline portion associated with the greater, initially determined tangent angle.

The elevation of the point $e$ will be determined from the maximum allowable unsupported free length of a section of pipeline 1 and the previously noted tangent angle determinations.

The mechanism 9 will be employed, if necessary, to adjust the elevation of the point $d$. The roller mechanisms 8 will be adjusted, if necessary, to modify the curvature of the portion $1b$ so as to obtain a uniform curvature for the pipeline $1b$ consistent with the previously determined tangent angles $i$ and $h$, which are made equal.

The adjustment in elevation effected by the connecting mechanism 9 will serve to enable the pipeline portion $1c$ to merge tangentially with the portion $1d$ at the point $d$ at the upper end of the ramp 6. The pipeline portion $1c$ may be allowed to assume the curvature of a cantilever pipe section extending from the point $c$. This curvature of the pipeline portion $1c$, for all practical purposes, will be equivalent to or substantially equal to a tangential extension of the portion $1b$, with the weight of the section $1c$ being sufficient to hold the section $1b$ on the roller assemblies 8. This approximation of curvatures will result from the relatively short distance between the points $c$ and $d$ and the large size and low flexibility of the pipeline being laid. As will be apparent, the determined curvature for the sections $1b$ and $1d$ will determine the elevation of the point $d$.

With the elevation of the point $e$ determined, the inclination of the pipeline $1d$ determined, and the location of the point $d$ determined as a consequence of the determination of the curvature of section $1b$, the length of the pipeline section $1d$ may be computed.

With the length of the section $1d$ having been computed, the necessary minimum length of the ramp 6 will have been determined. As will be apparent, the length of the ramp 6 may exceed the distance between points $d$ and $e$. However, the length should be such as to maintain the lower end of the ramp spaced above the surface 2 so that it maintains a buoyant lifting effect with respect to the pipeline 1.

The buoyancy of the various compartments in the ramp 6 will be selectively adjusted along the length of the ramp so as to main the straight inclination of the pipeline section $1d$ and maintain the desired inclination of this pipeline section.

The length of the ramp 6 may be appropriately adjusted by assembling an appropriate number of prefabricated ramp sections. These ramp sections may be connected by conventional fastening techniques so as to define an essentially unitary ramp structure.

While the ramp 6 comprises a generally unitary structure, the length of the ramp, which may be from several tens to several hundreds of feet, will be such as to cause the ramp 6 to have inherent vertical flexibility. This, coupled with the inherent vertical flexibility of the pipeline section $1d$, requires the above-noted selective adjustment and varying of buoyant lifting forces applied longitudinally along the ramp 6 so as to maintain the straight inclination of the axis of the pipeline section $1d$.

After the inclination of the ramp 6 has been determined, the elevation of the point $d$ and the elevation of the rollers 8 appropriately adjusted, the proper length of the ramp 6 obtained, the laying of pipe may be commenced.

In laying pipe, the vessel 5 moves generally longitudinally away from the point of contact $f$ of the pipeline 1 with the submerged surface 2. This movement is effected by winching-in or coiling-up the anchor lines 11 at the forward end $5a$ of the vessel, while paying out anchor lines at the stern $5b$ of the vessel by an equivalent amount. As pipe laying proceeds, additional sections of the pipeline are added at the free end of the pipeline on the vessel 5, i.e., at point $a$. This connection of sections may be effected, for example, by conventional welding techniques.

As pipe laying proceeds, the tensioning mechanism 10 continuously exerts and maintains a tension on the pipeline section $1a$ sufficient to prevent downward sliding movement of the inclined pipeline section $1d$. Desirably, the applied tension will not substantially exceed that which is just sufficient to prevent such sliding action.

In summary, the method involved in laying the pipeline 1 on the submerged surface 2 involves the employment of the ramp 6 to buoyantly and slidably support the pipeline portion $1d$ with its longitudinal axis being substantially straight and inclined relative to a horizontal plane and with the portion $1d$ being substantially submerged. From the vessel 5, the elevation of the upper end of the ramp 6 is selectively adjusted consistent with the above-noted stress determinations. Also from the vessel 5, and consistent with the previously noted stress determinations, the inclination of the ramp 6 is selectively adjusted and maintained and a plurality of independently controlled buoyant lifting forces are applied in longitudinally spaced relation along the portion $1d$.

While pipe laying proceeds, the mechanism 10 continuously applies and maintains selectively variable tension to the pipeline 1 in a direction tending to prevent movement of the pipeline section $1d$ toward the submerged surface 2.

When the ramp 6 is being initially positioned, and as pipe laying proceeds, operators on the vessel 5 continuously monitor the inclination of the ramp 6. This monitoring may be accomplished by the utilization of a plurality of commercially available sonic fathometers and a plurality of commercially available pressure responsive fathometers.

As shown schematically in FIGURE 1, one sonic fathometer may be positioned at location $12a$ of the hull of the vessel 5 at the stern end of the vessel while four additional fathometers may be disposed at locations $12b$, $12c$, $12d$, and $12e$ and be spaced along and mounted on the underside of the ramp 6, with the lowermost sonic fathometer at location $12e$ being at the lower end of the ramp.

Four pressure responsive fathometers may be disposed at locations 13a, 13b, 13c and 13d and be mounted on the upper side of the ramp 6 as generally shown in FIGURE 1.

Figure 15:
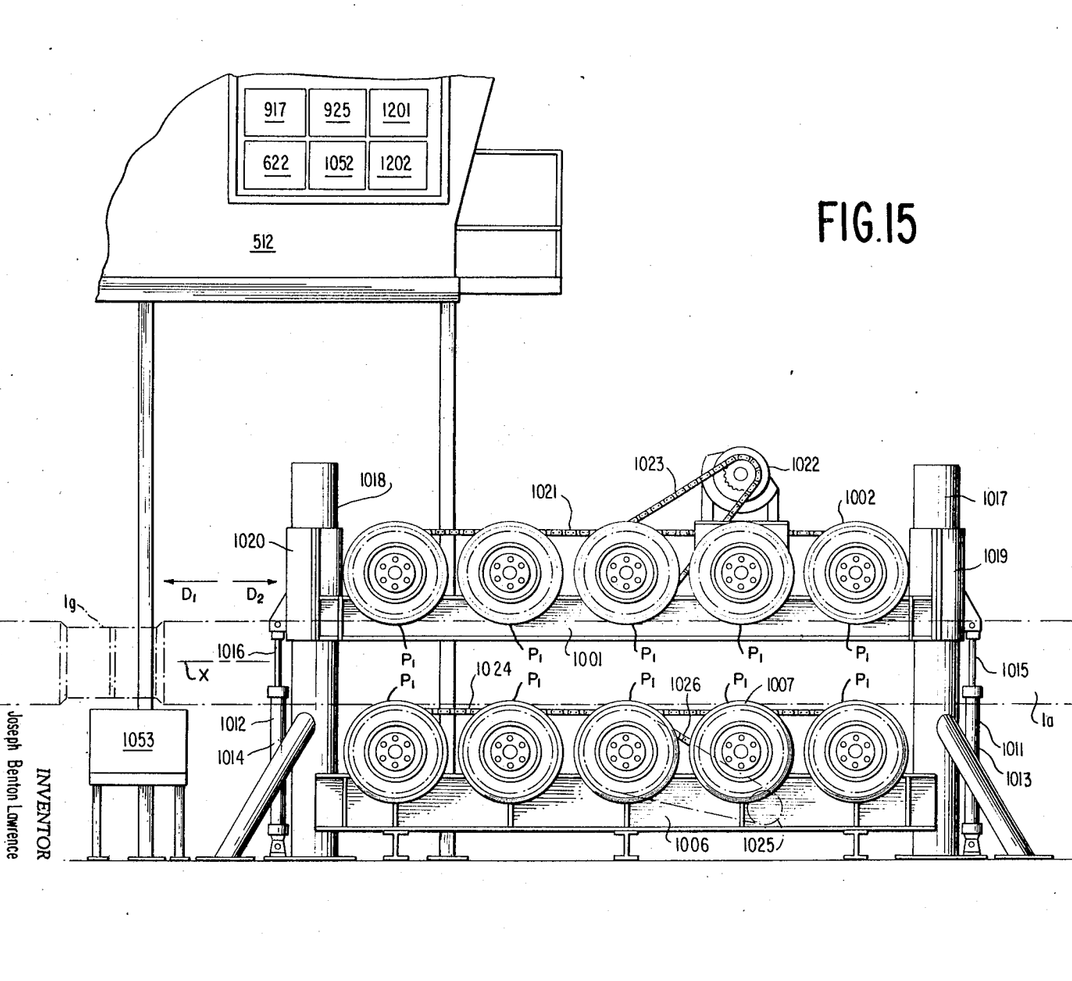
FIGURE 15 is an enlarged, schematic and fragmentary elevational view of the FIGURE 1 installation illustrating a mechanism for exerting tension on a pipeline being laid.

The sonic and pressure responsive fathometers, may be provided with conventional signal transmitting mechanisms which provide a visual depth reading indication of sonic and pressure readings on control panels 1201 and 1202, respectively, on vessel 5 as schematically shown in FIGURE 15.

The sonic fathometers will generate a sonic signal which will be reflected off the submerged surface 2 so as to provide a measurement of the elevation of spaced points along the ramp 6 with reference to the surface 2. The pressure responsive fathometers will provide measurements of the depth of a plurality of points of the ramp 6 beneath the surface 4. With these measurements provided by the sonic and pressure responsive fathometers, the inclination of the ramp 6 may be monitored with reference to both the surface 4 and the surface 2.

Figure 6:
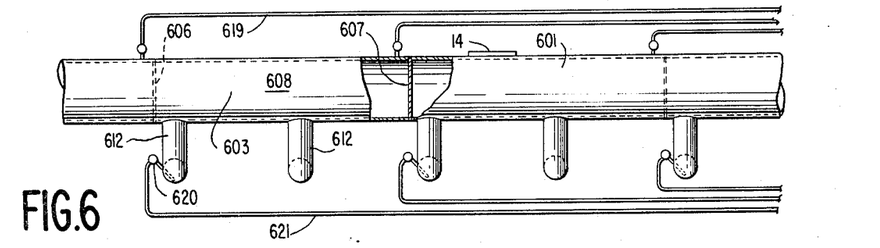
FIGURE 6 is an enlarged, fragmentary, elevational view of an intermediate portion of the ramp shown in FIGURE 1.
Figure 7:
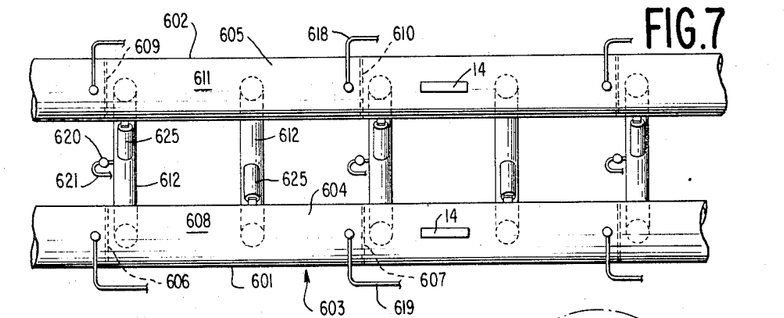
FIGURE 7 is a plan view of the intermediate ramp portion shown in FIGURE 6.

In addition, as schematically shown in FIGURES 6 and 7, a plurality of deflection type strain gauges 14 may be mounted on the top (or bottom) of the ramp 6 so as to provide an additional indication of any deflection in the ramp 6. The deflection indications provided by the strain gauges 14 may be transmitted to a control panel on the vessel 5.

Figures 8, 9:
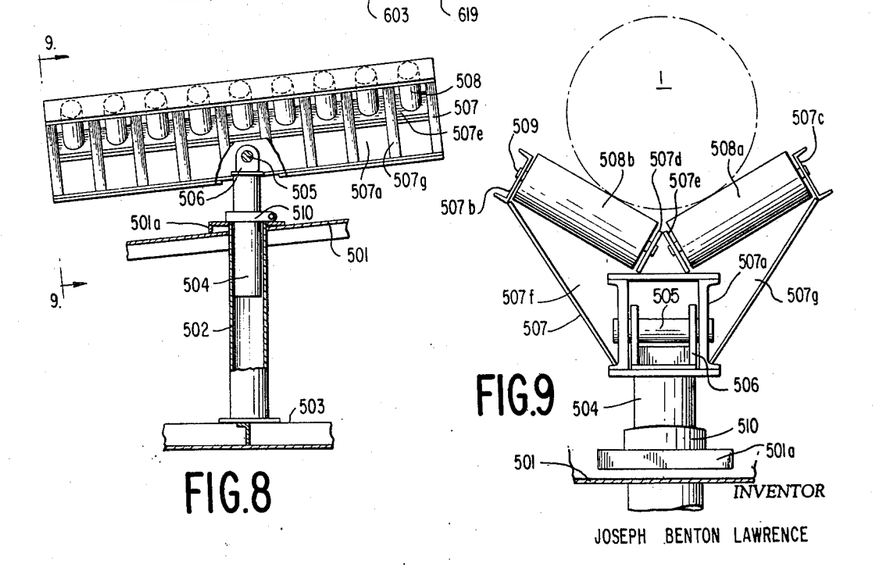
FIGURE 8 is a schematic, enlarged, elevational view of a vessel-carried ramp supporting and vertically adjustable roller assembly included in the FIGURE 1 apparatus.
FIGURE 9 is a schematic, enlarged, end view of the FIGURE 8 assembly as seen along the view direction 9—9.

In order to facilitate an understanding of the disclosure, structural details of the invention, delineated hereafter, are described by employing reference numerals in the "hundreds" series, with the prefix numbers being the same as those employed to describe basic components. Thus, structural details of the ramp 6, illustrated in FIGURES 6 and 7, are delineated by reference numerals in the "600" series. Structural details of miscellaneous equipment of the vessel 5, as illustrated in FIGURES 8 and 9, are defined by reference numerals in the "500" series. Structural details of the connecting mechanism 9, as shown in FIGURES 4, 5 through 10 and 14, are delineated by reference numerals in the "900" series. The tensioning, infeed, and outfeed mechanism 10 is illustrated in detail in FIGURES 15 through 19 with reference to numerals in the "1000" series.

RAMP STRUCTURE AND MODE OF OPERATION

The ramp 6 comprises a pair of generally parallel, tubular, and horizontally spaced and aligned pontoons 601 and 602. These pontoons, while preferably metallic and unitary in character, are flexible owing to their relative great length.

Figure 4:
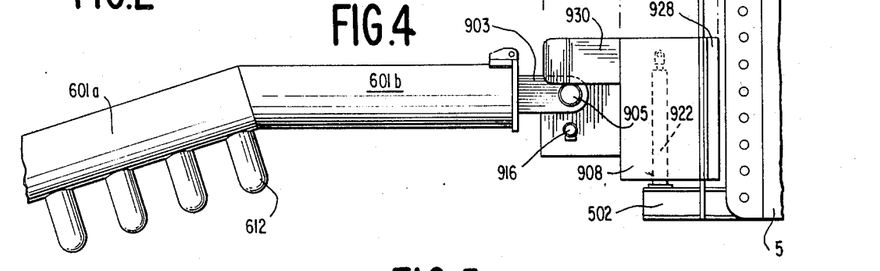
FIGURE 4 is an enlarged, schematic, and fragmentary elevational view of a portion of the FIGURE 1 assembly illustrating a connecting mechanism pivotally joining the ramp to the floating vessel.
Figure 5:
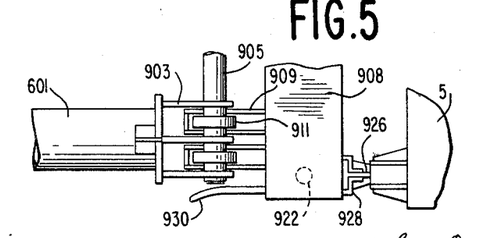
FIGURE 5 is an enlarged, fragmentary plan view of a portion of the FIGURE 4 assembly as seen along the view direction 5—5.

Each pontoon has a portion which is substantially submerged and inclined and another portion which is connected with the barge 5 and which may be disposed with its axis extending generally horizontally. Thus, as shown in FIGURE 4, the pontoon 601 includes an inclined and substantially submerged portion 601a and a generally horizontally extending tubular portion 601b.

The pontoons are divided into a series of longitudinally displaced buoyant compartments as generally shown in FIGURES 6 and 7. One such compartment 603, located in an intermediate portion of the ramp 6, comprises a tubular wall section 604 of the pontoon 601 and another generally tubular wall portion 605 of the pontoon 602. As illustrated, wall portions 604 and 605 are laterally adjacent each other, parallel and disposed at substantially the same elevation.

Transversely extending and longitudinally spaced bulkheads or walls 606 and 607 cooperate with the pontoon wall portion 604 to define a tubular chamber 608. Similarly, longitudinally spaced and transversely extending bulkheads or walls 609 and 610 cooperate with wall 605 of pontoon 602 to define another closed chamber 611.

Chamber connecting conduit means extend transversely between pontoon wall portions of laterally adjacent pontoon chambers and serve to place these chambers in fluid communication relationship.

As shown in FIGURE 7 in the intermediate portion of the ramp 6, this connecting means comprises one or more transversely extending, generally U shaped connecting conduits 612 which are connected with the underportions of tubular wall sections 604 and 605.

Figure 2:
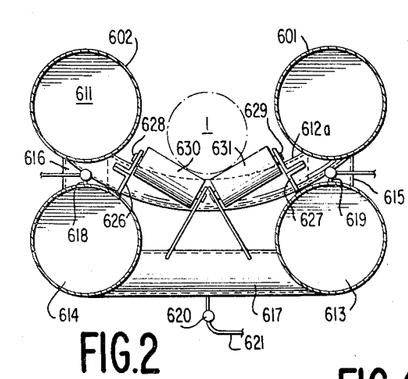
FIGURE 2 is a transverse, sectional, and enlarged schematic view of the lower end of the ramp shown in FIGURE 1 as viewed along the section line 2—2 of FIGURE 1.

At the lower end of the ramp 6, additional pontoon structures are provided, the buoyancy of which may be selectively and independently controlled from the vessel 5. Thus, as shown in FIGURES 1 and 2, a tubular pontoon length 613 is disposed beneath and parallel to the pontoon 601 while another tubular pontoon length 614 is disposed beneath and parallel to the pontoon 602. Pontoons 613 and 614 may be longitudinally divided by transverse bulkheads into longitudinally spaced chambers in the same fashion as that described in connection with the pontoons 601 and 602. Such a chamber of pontoon 613, which is disposed beneath a chamber 608 of the pontoon 601, may be connected in non-fluid communicating relationship with this chamber by a connecting conduit-like frame section 615 as generally shown in FIGURE 4. A similar connecting conduit 616 will serve to structurally interconnect superposed chambers of pontoons 602 and 614. Laterally adjacent chambers of pontoons 613 and 614 are placed in fluid communicating relationship by a transversely extending conduit section 617, disposed in relation to these chambers in a manner akin to the disposition of the conduits 612 which place chambers 608 and 611 in fluid communicating relationship.

Each such pair of laterally adjacent chambers in pontoons 613 and 614, interconnected by a transverse conduit 617, may be provided with separate buoyancy control means, independent of the buoyancy control means of the chamber 603 in the pontoons 601 and 602.

As will thus be appreciated, each set of laterally adjacent pontoon chambers 608 and 611 and their associated connecting conduits 612 define, in essence, a single, primary, buoyancy controlling compartment. Similarly, at the lower end of the ramp 6, each set of laterally adjacent chambers of pontoons 613 and 614 disposed beneath the pontoons 601 and 602, and their associated connecting conduit sections define an auxiliary, buoyancy controlling compartment.

Ramp 6 may be divided longitudinally into a plurality of longitudinally displaced, buoyancy control compartments 603 as previously described. Each such buoyancy control compartment is provided with independently and selectively operable, buoyancy adjusting means, the operation of which is remotely controllable from the vessel 5. Thus, as schematically shown in FIGURES 6 and 7, in the representative compartment 603, the chambers 611 and 608 are connected, respectively, with air lines 618 and 619. These air lines extend to conventional air flow control means on the vessel 5. The flow control means for the air flow lines of each individual compartment such as the compartment 603 are independently controllable from the vessel 5.

Each buoyancy control compartment is also provided with independently operable buoyancy adjusting means for introducing water from the body 3 into the compartment. Thus, as is schematically shown in FIGURE 6, a valve 620 is mounted on the lower portion of the connecting conduit 613, which portion will define the lowermost portion of the compartment when the ramp 6 is in its inclined position.

Valve 620 comprises a remotely operable valve for controlling and permitting the admission of water from the body 3 into the compartment 603. This valve may be operated remotely by fluid means conveyed through a conduit 621 extending to appropriate control means on the vessel 5. The control means for the valve 620 associated with each compartment is independently operable.

At the lower end of the ramp 6, the buoyancy control compartments 603 superposed above the pontoons 613 and 614 are provided with buoyancy control means such as those described previously. However, in this portion of the ramp, the connecting conduit 612 will be modified to assume the configuration 612a schematically shown in FIGURE 4 because of the dimensional interference provided by the pontoons 613 and 614.

As schematically shown in FIGURE 2, a water flow controlling valve 620 and air lines 618 and 619 may also be provided for each separate buoyancy control compartment defined by laterally adjacent chambers of the pontoons 613 and 614. The control mechanisms for these buoyancy control means, like those associated with the pontoons 601 and 602, will extend to conventional control mechanisms on the vessel 5.

In summary, it will be appreciated that the valve 620 may be viewed as first buoyancy adjusting means for selectively and independently supplying ballast to each buoyancy control compartment. Similarly, the air lines 618 and 619 may be viewed as second buoyancy adjusting means for selectively and independently introducing air into the compartments for causing the expulsion or removal of water ballast from the compartment through the appropriately opened valves 620.

The pontoons 601, 602, 613 and 614 may be provided with connecting, conduit-like frame members which are structurally the same as the connecting conduits 612 and 617. However, such frame members will be blanked off with reference to the pontoon chambers, i.e., they will not communicate with the chamber interiors.

When it is desired to increase the buoyancy of a buoyancy control compartment, the controls associated with this compartment on the vessel 5 are operated so as to cause air to be introduced into the compartment and water ballast to be displaced from the compartment through open valve 620. When it is desired to decrease the buoyant effect of a compartment, the controls on the vessel 5 associated with that compartment are appropriately operated so as to allow water to flow through the valve 620 to the compartment and to allow air within the compartment to be discharged through the air lines 618 and 619.

Commercially available valve structures may be employed for the structure of the valve 620. Similarly, commercially available control mechanisms may be employed to control the operation of the valve 620 and to control the flow of air through the lines 618 and 619. Accordingly, the structure of these elements is not shown so as to avoid obscuring the prominent aspects of the invention. As shown schematically in FIGURE 15, the independently operable controls for each pontoon compartment may be disposed on a control panel 622 on the vessel 5.

The longitudinally displaced series of buoyancy control compartments on the ramp 6 enables a longitudinal variation in the lifting forces applied by the ramp 6 to the pipeline section 1d. By appropriately adjusting the buoyancy of each compartment, the flexible pipeline and flexible ramp may be maintained at the desired inclination with the axis of the pipeline and the axes of the pontoons 601 and 602 remaining substantially straight. As will be appreciated, the buoyancy of different compartments may be selectively adjusted to offset tendencies for the ramp or pipeline to sag at different locations.

The provision of additional pontoons 613 and 614 at the lower end of the ramp 6 enables the lower end of the ramp to impart a greater lifting force to the pipeline than that which is imparted by other portions of the ramp. The pontoons 613 and 614 should have a sufficient buoyant lifting capacity such that, in cooperation with superposed portions of the pontoons 601 and 602, the lower end of the ramp 6 may exert a lifting force on the pipeline equal to half the weight of the pipeline section 1e, in addition to providing their share of support for the pipeline section 1d.

The chamber connecting conduit sections which extend between pontoon chambers serve to balance the lifting forces generated by laterally adjacent pontoon chambers.

The substantially straight and horizontally disposed pontoon sections adjacent the vessel 5 provide, about the ramp and in the vicinity of the vessel 5, an unobstructed zone which facilitates the transition of the pipeline from the ramp 6 to the vessel 5 along the pipeline length 1c.

In summary, it will be appreciated that the ramp 6 buoyancy supports the pipeline portion 1d with the axis thereof being substantially straight and inclined downwardly. An unsupported pipeline portion 1c extends upwards over the horizontal pontoon portions. The straight inclination of the pipeline section 1d is maintained by selectively applying and controlling independently variable buoyant forces along the ramp 6. The buoyant lifting forces are generated within the fluid body 3.

STRUCTURE FOR SLIDABLY SUPPORTING PIPELINE

The structure for slidably supporting the pipeline 1 includes the plurality of roller assemblies 7 carried by the vessel 5. Roller assemblies 7 comprise first support means for supporting the portion 1a of the pipeline with its axis extending in a straight and generally horizontal line.

The pipeline supporting mechanism additionally includes second support means. This second support means comprises a second plurality of vertically adjustable rollers 8 for slidably supporting the curved portion 1b of the pipeline.

Also included in the pipe supporting mechanism are a plurality of longitudinally spaced roller assemblies carried by the ramp 6. These ramp-carried roller assemblies define third support means for the pipeline.

The roller assemblies 8 may each comprise an assembly such as that schematically shown in FIGURES 8 and 9. Each such assembly is mounted on an inclined deck portion 501 of the vessel 5. Deck portion 501 slopes generally downwardly toward the connecting mechanism 9. A generally tubular mounting sleeve 502 is mounted generally flush with the deck 501 and projects downwardly to supporting framework 503.

A vertically reciprocable support shaft 504 is telescopingly disposed within the tubular mounting sleeve 502. At the upper end of support shaft 504 a pivot shaft 505 having a longitudinal axis is mounted. Pivot shaft 505 may be connected to the upper end of support shaft 504 by a schematically shown bracket 506. As illustrated, the horizontal axis of pivot shaft 505 lies in a plane extending generally perpendicular to a vertical plane extending along the longitudinal axis of the pipeline sections 1a and 1b.

A cradle-like frame 507 supports a series of mutually inclined, pipe cradle defining rollers 508 as generally shown in FIGURE 9. A series of longitudinally spaced parallel rollers 508a extends along one side of frame 507, while another series of parallel and longitudinally spaced rollers 508b extends along an opposite side of the frame 507. The rollers in series 508a are inclined with respect to the rollers in 508b so as to define an upwardly diverging, pipe cradling arrangement.

As illustrated, each roller 508 is rotatably mounted on a supporting shaft such as the schematically shown shaft 509 supporting a roller in the series 508b.

A downwardly opening U-shaped bracket portion 507a provides a mechanism for pivotally connecting the frame 507 to the pivot shaft 506 as schematically shown in FIGURE 9.

As illustrated, frame 507 includes longitudinally extending channel members 507b and 507c as well as centrally disposed, plate members 507d and 507e which support the roller pivot shafts. Plates 507d and 507e are mounted on a top portion of bracket 507a. Transversely extending, reinforcing webs 507f and 507g serve to interconnect the bracket 507a and the channel members 507c and 507b.

A conventional, selectively releasable, pipe-type clamp 510 serves to clampingly engage the periphery of the reciprocable shaft 504. Clamp 510 defines abutment means securely engaged with the shaft 504 for preventing downward movement of the roller assembly 8. By appropriately adjusting the position of the clamp 510 on the shaft 504, the elevation of the rollers 508 may be appropriately determined. Alternatively, hydraulic or pneumatic elevating, jack-like mechanisms may be employed to selectively adjust the elevation of the rollers 508.

As shown, the deck 501 may include a step-like portion to flushly engage the clamp 510.

As will be appreciated, when a pipeline 1 is supported on the roller assembly 8, as shown in phantom line in FIGURE 9, the frame 507 will pivot freely about the pivot shaft 506 so as to provide optimum, automatically conforming, engagement between the rollers 508 and the underside of the pipeline 1.

Roller assemblies 7 may be similar to roller assemblies 8. However, the roller assemblies 7 need not include a pivotal connection between the roller supporting frame and the frame supporting shaft or column.

Figure 3:
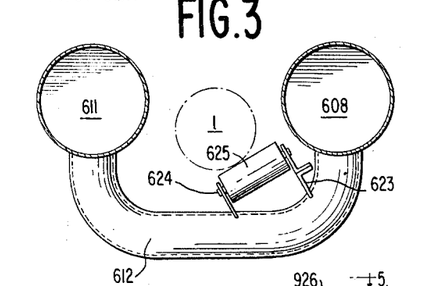
FIGURE 3 is a transverse, sectional and enlarged schematic view of an intermediate portion of the ramp shown in FIGURE 1 as viewed along the section line 3—3 of FIGURE 1.

The roller assemblies disposed on the intermediate and upper portion of the ramp 6 are schematically illustrated in FIGURES 3 and 7. As there shown, a frame 623 on each connecting conduit 612 supports a shaft 624. A roller 625 is rotatably mounted on each shaft 624. The axis of rotation of each roller 625 is inclined relative to a horizontal plane and each roller is disposed so that the upper roller surface faces generally toward the center of the space between the pontoons 601 and 602.

As shown in FIGURE 7, rollers on adjacent connecting conduit 612 are inclined in generally opposite directions but at the same degree of inclination.

The roller arrangement illustrated in FIGURES 3 and 7 enables a pipeline 1, as shown in phantom line in FIGURE 3, to be cradled by the alternately inclined rollers, with a general mid-portion of each roller engaging the underside of the pipeline 1. This roller arrangement on the ramp 6 provides a pipeline centering action.

At the lower end of the ramp 6, each connecting conduit 617 may be provided with a pair of frames 626 and 627 which support mutually inclined, but generally transversely aligned, roller shafts 628 and 629, respectively. Roller shafts 628 and 629, which have coplanar axes, in turn rotatably support pipeline carrying rollers 630 and 631. As will be recalled, the lower end of the pontoon 601 may include a plurality of compartments, each provided with at least one connecting conduit 617. Thus, a series of longitudinally spaced, paired rollers may be provided at the lower end of the ramp 6.

The rollers on the ramp 6 are supported by the connecting conduit means, as above described, and are disposed in an elevation lower than the centers of the pontoons 601 and 602 so as to provide an inherently stable, pipe cradling support. With this supporting arrangement, the rollers on the ramp 6 support the pipeline portion 1d with the longitudinal axis of the pipeline disposed beneath and centered between the longitudinal axis of the pontoons 601 and 602.

With the pipeline supporting arrangement above described, the rollers 7 slidably support the pipeline section 1a such that its longitudinal axis is substantially horizontal. The rollers on the ramp 6 slidably support a pipeline portion 1d such that its longitudinal axis is substantially straight and inclined downwardly.

Roller assemblies 8 slidably support curved pipeline portion 1b and automatically conform to the curvature of this section.

An unsupported pipeline section 1c extends between the ramp 6 and the roller assemblies 8 while another unsupported portion 1e extends from the lower end of the ramp 6 to the submerged surface 2.

On the ramp 6, the longitudinally displaced, buoyancy controlling compartments are employed to exert selectively variable buoyant lifting forces on the pipeline portion 1d. These forces are independently and remotely variable longitudinally along the pipeline portion 1d and are generated adjacent thereto. The buoyant lifting forces imposed by the ramp 6 upon the pipeline section 1d are generated generally laterally of and on each side of the pipeline portion 1d and transmitted through the connecting conduit means and ramp roller assemblies to the underside of the pipeline.

By means of the connecting conduit means extending transversely between adjacent pontoon chambers, the buoyant forces generated by the pontoons on each side of the pipeline section 1d are balanced.

MECHANISM CONNECTING RAMP AND BARGE

Structural details of the connecting mechanism 9, which pivotally attaches the ramp 6 to the barge 5, are shown in FIGURES 4, 5 and 10 through 14.

In describing this connecting mechanism, reference will first be made to the basic embodiment illustrated in FIGURES 4, 5 and 10 through 12.

In this basic embodiment, a first plurality of longitudinally extending, horizontally and laterally spaced mounting plates 901 are connected by a bracket 902 to the end of the pontoon 602 adjacent the barge 5. A second plurality of longitudinally extending and horizontally and laterally spaced mounting plates 903 are connected by a bracket 904 to the end of the pontoon 601 facing the barge 5. A pivot shaft 905 projects transversely of the pontoons 601 and 602, connects the ends of the pontoons adjacent the barge 5, intersects apertured portions of the mounting plates 901 and 903, and is connected to and supported by these plates.

A first plurality of longitudinally extending and horizontally and laterally spaced recessed retaining plates 907 are connected to the housing means 908 and project from housing means 908 generally toward the mounting plates 901. A second plurality of longitudinally extending and horizontally and laterally spaced recessed retaining plates 909 are also carried by the housing means 908 and project generally toward the mounting plates 903.

Figure 10:
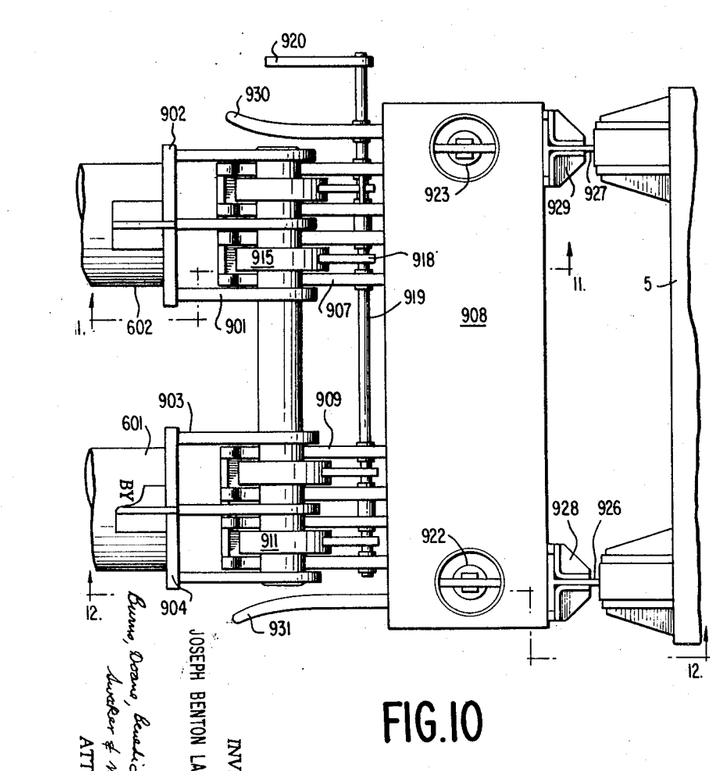
FIGURE 10 is an enlarged, fragmentary, and schematic plan view of the connecting mechanism illustrated in FIGURE 4.

As shown in FIGURE 10, each pair of adjacent retaining plates 907 is disposed at least partially between each pair of adjacent mounting plates 901. In the embodiment shown in FIGURE 10, two such pairs of retaining plates 907 are disposed between two recesses defined by three mounting plates 901.

Figure 12:
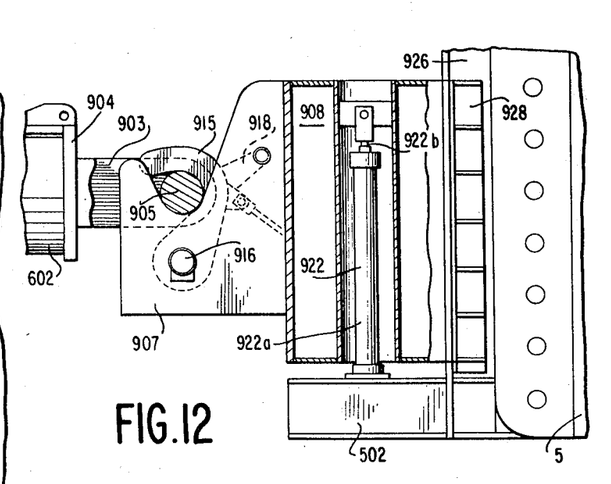
FIGURE 12 is a fragmentary, schematic and partially sectioned, elevational view of the FIGURE 10 connecting mechanism as viewed along the section line 12—12.

Each of the identical retaining plates 907 and 909, as shown in FIGURE 12 in connection with the representative plate 907, has an upwardly opening and diverging recess 910.

The recessed retaining plates 907 and 909 comprise mounting means, with the recesses 910 which receive and support the pontoon pivot shaft 905, preventing downward movement of this shaft.

Latching means included in the connecting mechanism 9 serve to secure the pontoon pivot shaft 905 in the retaining plate recesses 910.

This latching means comprises a plurality of laterally and horizontally spaced plate-like hooks which are mounted between and thus protected by the retaining and mounting plates.

One plurality of plate-like hooks 911 is mounted on a first pivot shaft 912 in generally longitudinal alignment with the pontoon 601. The hooks 911 are rotatably mounted on the shaft 912, with the axis of the shaft 912 extending horizontal and generally perpendicular to the plates 909. Each individual hook 911 is disposed between a pair of retaining plates 909. An individual, fluid operated, piston and cylinder assembly 913 is pivotally connected to a hook 911 and a bracket 914 on the housing means 908. Fluid supplied to the piston and cylinder assembly 913 under the influence of a control mechanism disposed on the barge 5 serve to induce selective pivoting action of the hook 911 about the shaft 912. Thus, by appropriately supplying fluid to the piston and cylinder mechanism 913, the hook 911 may be caused to pivot toward the shaft 905 so as to secure the shaft within the recess of mounting plates 909 or to pivot toward the housing means 908 so as to allow the pontoon shaft 905 to be moved upwardly out of the plate recesses.

The latching means includes another plurality of hooks 915 generally longitudinally aligned with the pontoon 602. Hooks 915 are mounted on a pivot shaft 916, the axis of which is coaxial with the axis of the shaft 912.

Each hook 915 is provided with an individually operable piston and cylinder mechanism, such as the mechanism 913 associated with each hook 911. Each hook 915 is mounted for independent pivotal movement between a pair of adjacent retaining plates 907, as shown in FIGURE 10.

As will be appreciated, the control mechanism on the vessel 5 for operating the hook movement inducing piston and cylinder mechanisms may effect simultaneous or individual pivotal action of the hooks 915 and 911.

The mechanisms for controlling the operation of the hooks 911 and 915 may be disposed on a control panel 917 on the vessel 5.

Figure 11:
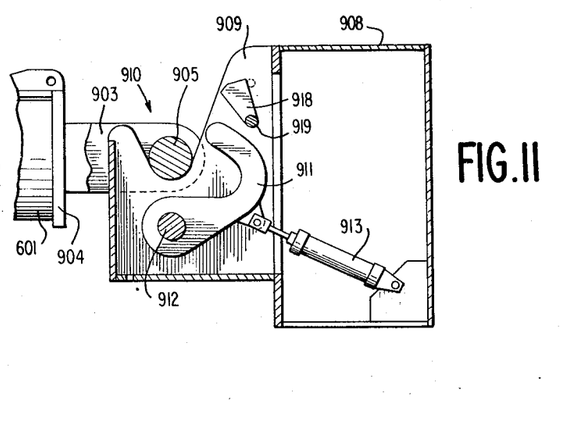
FIGURE 11 is a fragmentary, schematic, and partially sectioned, elevational view of the FIGURE 10 connecting mechanism as viewed along the section line 11—11.

A detent arrangement may be employed to positively secure the hooks 911 and 915 in their position shown in FIGURE 11 where they prevent movement of the pontoon shaft 905 upwardly out of the retaining plate recesses.

This detent arrangement may comprise a plurality of detents 918 connected to a horizontal shaft 919. Shaft 919 may be journaled in the retaining plates 909 and 907 as schematically shown in FIGURE 10. An operating lever 920 may be secured to one end of the rotatable detent mounting shaft 919. Transverse force applied to the lever 920 will induce pivotal action of the shaft 919 so as to, in turn, cause pivotal movement of the detents 918.

Each detent is longitudinally aligned with, and engageable with, a hook 915 or a hook 911. As shown in FIGURE 11, the detents 918 may be pivoted downwardly to engage and secure the hooks when they are in a pontoon shaft securing position. In this position of the detents 918, the hooks are prevented from pivoting out of pontoon shaft securing position. With the detents at an upper position, which may be limited by a schematically shown abutment rod 921, the hooks 911 and 915 may undergo free pivotal movement.

Housing means 908 is supported above a cantilever type platform 502 which projects outwardly from the stern of the vessel 5 generally toward the ramp 6. A pair of fluid operated piston and cylinder mechanisms 922 and 923, respectively, serve to cause selective adjustments in elevation of the housing means 908 and thus serve to adjust the elevation of the end of the ramp 6 adjacent the vessel 5. In the arrangement shown in FIGURE 11, the cylinder 922a of the piston and cylinder mechanism 922 is mounted on the platform 502 while the piston rod 922b is connected by a bracket 924 to the housing means 908. The axes of the piston rod 922b and the cylinder 922a extend vertically upwardly from the platform 502.

The piston and cylinder mechanism 923 may be secured to the housing means 908 and the platform 502 in a manner identical to that described in connection with the mechanism 922.

Pressurized fluid may be supplied to the piston and cylinder mechanisms 922 and 923 to induce selectively controlled changes in elevation of the upper end of the ramp 6 under the influence of conventional control means disposed on the barge 5. Such control means, for example, may be mounted on a control panel 925.

A pair of generally vertically extending and horizontally spaced T-shaped rails 926 and 927 are connected to the stern end of the vessel 5 as generally shown in FIGURE 10, with the head portions thereof facing toward the ramp 6. A pair of T-slot defining rail guides 928 and 929 are connected to the housing means 908. The rail 926 is disposed within the T-shaped slot of the guide 928 such that the guide is stabilized for vertical sliding movement. The T-shaped rail 927 is similarly disposed in connection with the guide 929. Thus, the rails 926 and 927 and the rail guides 928 and 929 comprise rail means for causing the housing means of the connecting means 9 to travel through a vertical path.

A pair of horizontally spaced, camming plates 930 and 931 are connected to the housing means 908 and diverge generally horizontally and toward the ramp 6. These camming plates are adapted to cammingly guide the ramp end supporting the shaft 905 into centered alignment with the recessed retaining plates 907 and 909. These plates thus facilitate the positioning of the pairs of retaining plates between mounting plates carried by the ramp 6, as shown generally in FIGURE 10. Thus, the camming plates 930 and 931 serve to guide the pivot shaft means 905 into connecting alignment with the recessed retaining plates.

The ramp end 6 supporting the pivot shaft 905 may be moved into connected relation with the recessed retaining plates of the connecting means 9 by a hoisting mechanism carried on the deck of the vessel 5. The ramp 6 may be floated into position adjacent the stern of the vessel 5 to enable this hoisting mechanism to engage the ramp end and lift it so as to bring the pivot shaft 905 into connected relation with the recessed retaining plates.

Figure 13:
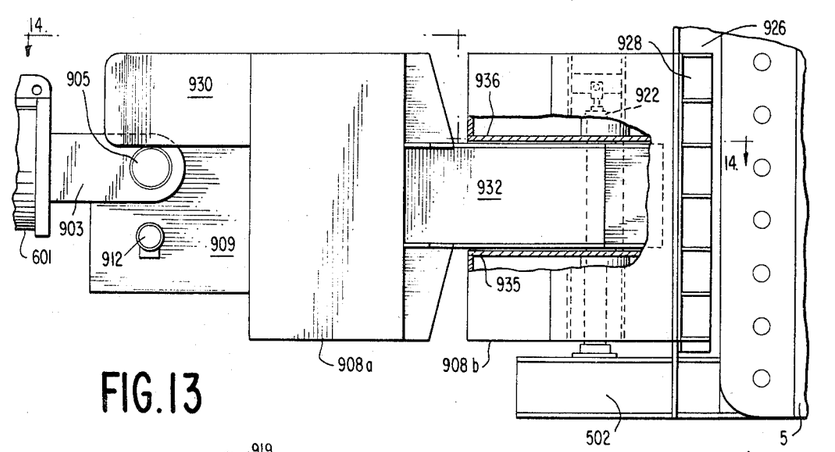
FIGURE 13 is an enlarged, fragmentary, partially sectioned, schematic, elevational view of an alternative embodiment of the connecting mechanism shown in FIGURE 4, which alternative embodiment includes pivot means enabling limited pivotal movement between the ramp and barge of the FIGURE 1 installation.
Figure 14:
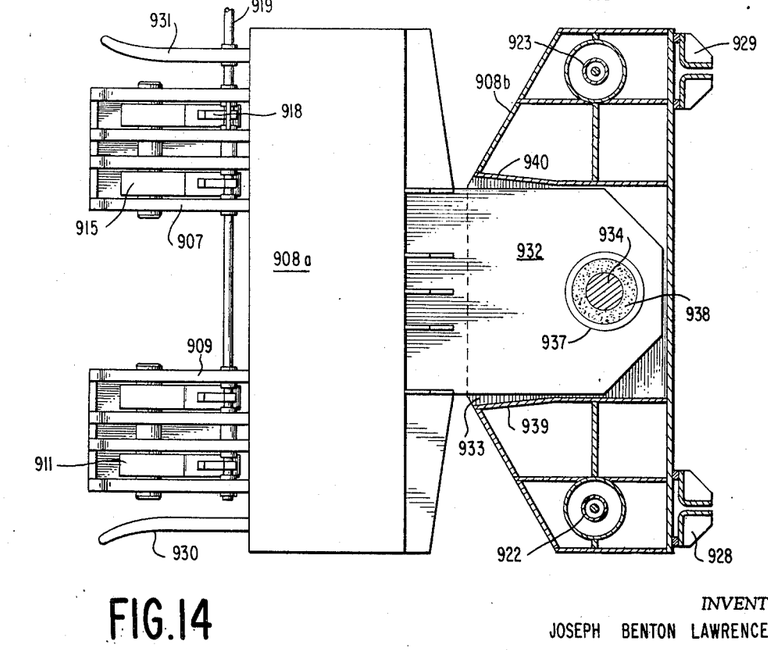
FIGURE 14 is a schematic, partially sectioned, plan view of the FIGURE 13 embodiment of a connecting mechanism as viewed along the section line 14—14.

FIGURES 13 and 14 illustrate a refined embodiment of the connecting means 9 which enables limited horizontal pivotal movement between the ramp 6 and the vessel 5.

In this embodiment the housing means 908 is divided into two pivotally interconnected housings 908a and 908b.

The first housing 908a supports the camming plates 930 and 931, the recessed retaining plates 909 and 907 and the pivoted hooks 911 and 915 and their associated and cylinder operating mechanisms, as generally shown in FIGURE 14. The second housing means 908b supports the rail guides 928 and 929 and is slidably connected to the stern of the vessel 5.

A tongue-like portion 932 is connected to the housing 908a and projects into a recess 933 of the housing 908b. A vertical pivot shaft 934 is rigidly supported between vertically spaced plates 935 and 936 in the housing 908b. Tongue 932 supports a cylindrical housing 937 which confines and supports a resilient cylindrical bushing 938. Pivot shaft 934 extends through and is rotatable within bushing 938 as generally shown in FIGURE 14.

With this arrangement, the housings 908a and 908b may undergo relative horizontal pivotal movement about the vertical axis of the pivot shaft 934. The resilient bushing 938 will accommodate some relative twisting between these housings. Thus, the embodiment illustrated in FIGURES 14 and 15 will, to some extent, accommodate relative pivotal or twisting movements between the barge 5 and ramp 6 induced by surface wave action.

Housing 908b may be provided with horizontally spaced abutment plates 939 and 940 disposed on opposite sides of the tongue 932. These butment plates serve to engage the sides of tongue 932 to limit the free pivotal movement between the housing 908a and 908b to a predetermined acute angle.

TENSIONING MECHANIM AND MODE OF OPERATION

Structural details of the tensioning mechanism 10 are illustrated in FIGURES 15, 16, 17, 18 and 19.

Figures 16, 17:
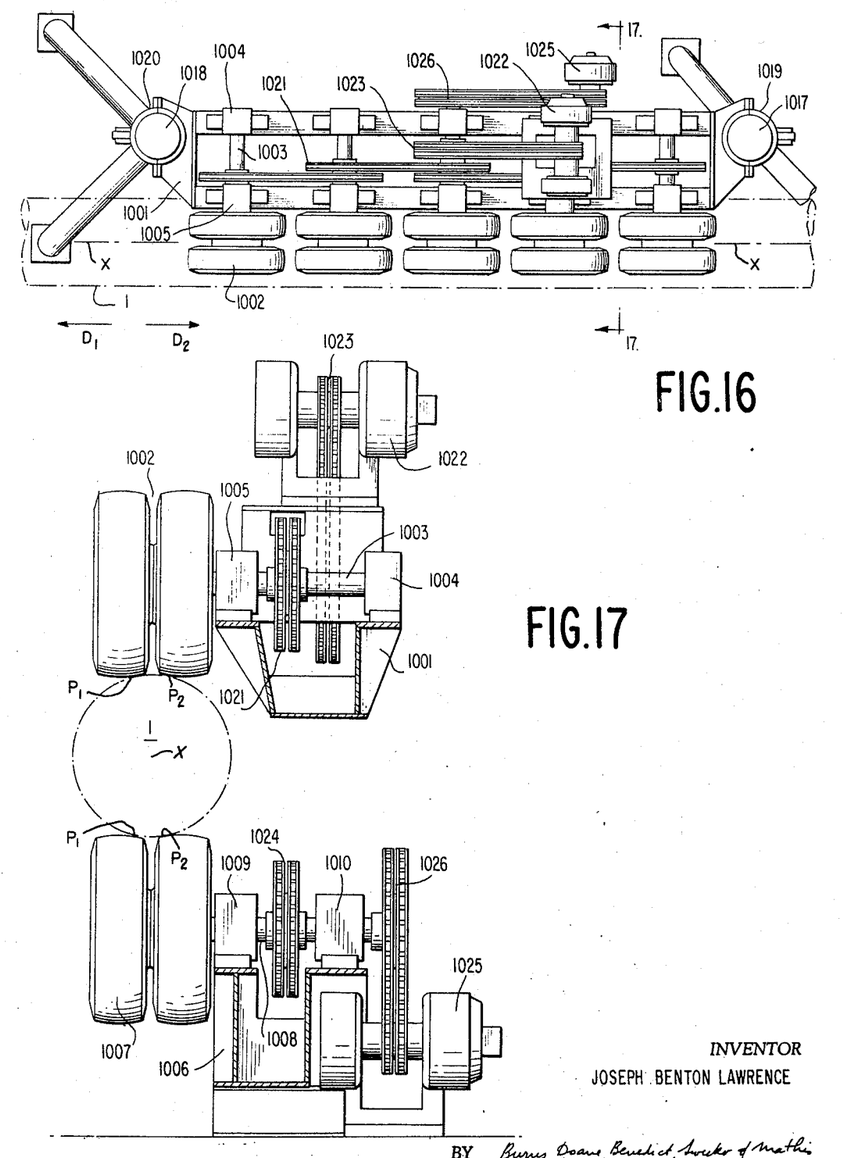

Tensioning mechanism 10 includes a first, generally vertically reciprocable frame 1001. Frame 1001 supports a plurality of rotatable, dual, air inflated (and thus compressibly yieldable) and rubber (and thus friction resistant or gripping) tire assemblies 1002 as generally shown in FIGURES 15 and 16. The dual tire assemblies carried by frame 1001 are disposed such that each assembly 1002 has a horizontal axis of rotation extending generally perpendicular to a vertical median plane extending through the longitudinal axis of the pipeline section 1a. The axes of rotation of the various assemblies 1002 carried by the frame 1001 are aligned in a common horizontal plane so as to be disposed substantially equidistant from and above the pipeline section 1a as shown in phantom line in FIGURES 15, 16 and 17.

As illustrated in FIGURE 16, each dual pneumatic tire assembly 1002 is mounted on a shaft 1003 which is journaled in bearing assemblies 1004 and 1005. Bearing assemblies 1004 and 1005 are mounted on frame 1001 as schematically shown in FIGURE 17.

Mechanism 10 additionally includes a second stationary frame 1006. Frame 1006 supports a second plurality of rotatable, dual, pneumatic and rubber tire assemblies 1007. Each dual tire assembly 1007 has an axis of rotation which extends horizontally and generally perpendicular to a median plane extending through the longitudinal axis of the pipeline section 1a.

The axes of the dual tire assemblies 1007 carried by the frame 1006 are spaced horizontally along the axis of the pipeline section 1a and are aligned in a common horizontal plane. With this disposition, the axes of rotation of the dual tire assemblies 1007 are generally equidistant from and disposed below the pipeline section 1a.

Each dual tire assembly 1007 is supported on a rotatable shaft 1008. Each such shaft 1008 is journaled in bearing assemblies 1009 and 1010, which bearing assemblies are supported on frame 1006 as generally shown in FIGURE 17.

As illustrated in FIGURES 15, 16 and 17, each assembly 1002 is superposed above an assembly 1007. The assemblies 1002 and 1007 are arranged such that a common median vertical plane extending between the pneumatic tires of each assembly 1002 and 1007 passes through the longitudinal axis of the pipeline section 1a.

As illustrated in FIGURE 17, the tires in each assembly 1002 are coaxially mounted on a shaft 1003. Similarly, the tires in each assembly 1007 are coaxially mounted on a shaft 1008.

Selectively controlled vertical reciprocation of the frame 1001 relative to the frame 1006 is effected by a pair of hydraulically operated piston and cylinder assemblies 1011 and 1012. In the embodiment illustrated in FIGURE 15, the cylinder components 1013 and 1014 of these assemblies are connected to a vessel deck portion 511. The piston rods 1015 and 1016 of these assemblies are connected with opposite ends of the frame 1001 as generally shown in FIGURE 15.

Stabilization of the vertical movement of the frame 1001 is obtained by guide columns 1017 and 1018, which project vertically upwardly from the deck section 511. Guide columns 1017 and 1018 are telescopingly received within generally cylindrical portions 1019 and 1020 of the frame 1001.

The dual tire assemblies 1002 are interconnected in series driving relationship by a sprocket chain mechanism 1021. A hydraulically operated, rotary motor 1022 carried by the frame 1001 serves to impart torque to one of the shafts 1003 of the first plurality of dual tire assemblies as schematically shown in FIGURES 16 and 17. This transmission of torque is effected by a schematically illustrated, sprocket chain mechanism 1023.

The second plurality of dual tire assemblies 1007 are interconnected in series driving relationship by a schematically shown sprocket chain mechanism 1024. A hydraulically operated rotary motor 1025 imparts torque to one of the shafts 1008 associated with one of the assemblies in the second plurality of dual tires. A schematically shown sprocket chain mechanism 1026 serves to transmit torque from the motor 1025 to this one shaft 1008. As illustrated, hydraulic motor 1028 is mounted on frame 1006.

Figures 18, 19:
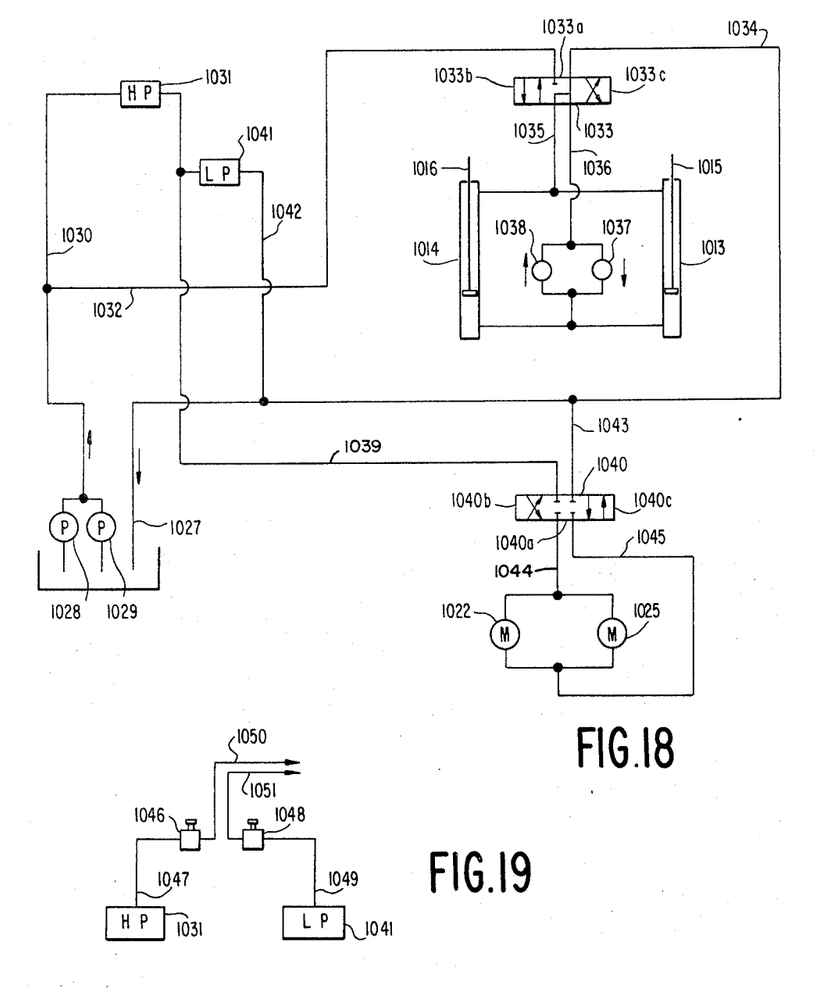
FIGURE 18 is a schematic representation of a hydraulic circuit employed to control the operation of the FIGURE 16 tensioning mechanism.
FIGURE 19 is a schematic representation of a remote control circuit which may be employed to monitor and regulate the operation of the FIGURE 18 circuit.

Figures 18 and 19 schematically illustrate hydraulic operating and control circuits which may be employed to operate and remotely control the tensioning mechanism 1010.

The operating circuit schematically shown in FIGURE 18 includes a sump or source 1027 of hydraulic fluid. A pair of pumps 1028 and 1029 may be employed to transmit pressurized hydraulic fluid along a conduit 1030 to a conventional, relatively high pressure regulating or maintaining valve 1031. A branch conduit 1032, upstream of valve 1031, serves to transmit relatively high pressure fluid, the pressure which is determined by valve 1031, to a conventional, manually operated slide valve 1033. A fluid return line 1034 extends from the slide valve 1033 to the sump 1027.

One outflow line 1035 extends from the slide valve 1033 and branches to communicate in parallel with the upper ends of the cylinders 1013 and 1014. Another outflow conduit 1036 extends from the slide valve 1033 and branches to communicate in parallel with the lower ends of the cylinders 1013 and 1014.

As schematically shown in FIGURE 18, line 1036 may be provided with the flow control means comprising a check valve 1037 which permits flow toward the lower ends of the cylinders 1013 and 1014 but prevents flow in the opposite direction. A conventional pressure maintaining valve 1038 included in this flow control means permits flow from the lower ends of the cylinders 1013 and 1014 to the slide valve 1033 only when fluid pressure is exerted on the upper ends of the pistons associated with the piston rods 1015 and 1016 sufficient to overcome a hydraulic back pressure acting beneath the pistons within cylinders 1013 and 1014 and balancing the weight of the frame 1001 and its various associated components. In this fashion, the valve 1038 serves to prevent the frame 1001 from falling when pressurized hydraulic fluid is not supplied to the lower ends of the cylinders 1011 and 1012.

As schematically shown in FIGURE 18, the central portion 1033a of the spool valve 1033 is ported so as to prevent the supplying of pressurized fluid to either of the lines 1035 and 1036. When this neutral position portion of the valve 1033 is disposed in communication with the lines 1035 and 1036 as shown, the lines 1035 and 1036 are disposed in fluid communication. Thus, should any inadvertent movement of the frame 1001 occur while the valve is in this neutral position, fluid will be transferred from one end of the cylinders to the other to prevent the forming of air pockets in the circuit.

When the valve portion 1033b is disposed in communication with the lines 1032, 1034, 1035 and 1036, hydraulic pressure will be supplied to the upper ends of the cylinders 1013 and 1014 so as to move the piston rods 1015 and 1016 downward and thus lower the frame 1001. When the valve portion 1033c is disposed in fluid communication with the lines 1032, 1034, 1035 and 1036, pressurized hydraulic fluid will be supplied to the lower ends of the cylinders 1013 and 1014 so as to cause the elevation of the piston rods 1015 and 1016 and thus elevate the frame 1001.

A conduit 1039 extends from the downstream side of pressure regulating valve 1031 to a manually operable, slide valve 1040. Slide valve 1040 serves to control the supplying of pressurized operating fluid to the rotary motor 1025 and 1022.

Relatively low pressure is maintained in the line 1039, i.e., pressure lower than that in line 1032, by a conventional, flow pressure regulating or maintaining valve 1041. Flow pressure regulating valve 1041 is disposed in a conduit 1042 which branches from conduit 1049 and communicates with return line 1034.

A return conduit 1043 extends from slide valve 1040 to return line 1034.

An outflow line 1044 extends from the slide valve 1040 and branches to communicate, in parallel, with a supply port on one side of the rotary motors 1022 and 1025. Another outflow line 1045 extends from the slide valve 1040 and branches to communicate, in parallel, with other supply ports in the rotary motors 1022 and 1025. In a conventional fashion, pressurized fluid supplied through the line 1044 will induce counter directional rotation of these motors tending to tension the pipeline in one direction, while fluid supplied through the line 1045 will induce counter directional rotation of the motors tending to tension the pipeline in an opposite direction.

The central or neutral portion 1040a of the slide valve is ported so as to prevent the supplying of pressurized fluid from the line 1039 to either of the outflow lines 1044 or 1045. When an operating portion 1040b of the slide valve is placed in communication with the lines 1039, 1043, 1044 and 1045, pressurized fluid will be supplied to the line 1045 so as to flow in parallel to the motors 1022 and 1025 to cause their counter directional rotation. When the opposite operating portion 1040c of the slide valve 1040 is placed in communication with the lines 1039, 1043, 1044 and 1045 pressurized fluid will be supplied to the line 1044 so as to cause the counter directional rotation of the motors 1022 and 1025 in directions opposite to those resulting from the flowing of fluid through the line 1045.

Rotary motors 1022 and 1025 may be provided with conventional safety mechanisms including braking devices which operate automatically in response to a failure in the hydraulic system. Thus, if the hydraulic system should fail, the tire assemblies 1002 and 1007 would maintain some holding action on the pipeline 1.

Each of the flow regulating valves 1031 and 1041 may be provided with fluid responsive pressure, setting mechanisms of a conventional and commercially available character. Thus, a hydraulic actuated control 1046 may be connected with high pressure regulating valve 1031 by a connecting conduit 1047. Similarly, a hydraulic control 1048 may be associated with the low pressure regulating valve 1041 and connected with this valve by a conduit 1049. Conduits 1050 and 1051, respectively, may extend from the control units 1046 and 1048, respectively, to a source of hydraulic actuating fluid not shown.

Controls 1046 and 1048 are preferably disposed at a location remote from the tensioning mechanism 10 and at a location where the overall pipe laying operation may be observed. Thus, the controls 1046 and 1048 may be mounted on a control panel 1052. Control panel 1052, as well as the previously noted control panels 622, 917, 925, 1201 and 1202, may be disposed in an elevated tower 512, as generally shown in FIGURES 1 and 15. An operator in this tower thus has control over the overall pipe laying operation and can observe the entire operation from his location.

The slide valves 1033 and 1040, which are manually operable, may be located in close proximity to the tensioning mechanism 10. Thus, for example, these slide valves may be mounted on a control panel 1053 located immediately adjacent to the tensioning mechanism 10.

It will be understood that the structure of the valve regulating devices and hydraulic motors shown schematically in FIGURES 18 and 19 are conventional in character and represent commercially available structures. For these reasons, details of these structures have been illustrated.

In summary, it will be appreciated that the dual tire assemblies 1002 comprise first compressing means in a preferred embodiment entailing a first plurality of rotary means adapted to engage the upper side of the pipeline section 1a. Dual tire assemblies 1007 comprise second pipeline compressing means in a preferred embodiment entailing a second plurality of rotary means adapted to engage the underside of the pipeline section 1a. The piston and cylinder assemblies 1011 and 1012 provide means for causing selective convergences and separation of the first plurality of rotary means 102 and the second plurality of rotary means 1007. The hydraulic motors 1022 and 1025 provide means for applying torque forces to the dual tire assemblies 1002 and 1007.

While a pipeline is being laid, the frame 1001 is depressed so as to cause the dual tire assemblies 1002 and 1007 to compressively and frictionally engage generally opposite sides of the pipeline section 1a. Torque is imparted to the dual tire assemblies by the hydraulic motors 1022 and 1025 such that the dual tire assemblies 1002 and 1007 exert a series of longitudinally spaced, continuously effective, tensioning forces on the top side of the pipeline section 1a as well as on the lower side of this pipeline section.

The magnitude of the compressive force exerted by the assemblies 1002 and 1007 against the pipeline section 1a, and the magnitude of the torque forces exerted by these dual tire assemblies on this pipeline section, are appropriately adjusted by manipulation of the controls 1046 and 1048 so as to maintain the desired holding and tensioning effect on the pipeline 1. Desirably, the dual tire assemblies should engage the pipeline and exert tensioning forces thereon as a result of torque applied to the assemblies of a magnitude just sufficient to prevent the free sliding of the pipeline 1 along the ramp 6. This will prevent the pipeline from moving freely down the ramp 6 under the influence of its own weight so as to cause buckling of the pipeline in the vicinity of the submerged surface 2.

Under certain circumstances, it may be desirable to retrieve a portion of a submerged pipeline, i.e., bring a portion of the line back onto the vessel 5. This may be readily accomplished by applying sufficient torque to the rotary, dual tire assemblies 1002 and 1007 to feed the pipeline back onto the vessel 5.

Under other circumstances, it may be desirable to reverse the direction of pressurized fluid through the hydraulic motors 1022 and 1025 so as to positively feed the pipeline 1 onto the ramp 6.

During the usual pipe laying operation, a predetermined torque will be applied to the dual tire assemblies 1002 and 1007 so as to continuously maintain a predetermined tension on the pipeline 1. While the vessel 5 is stationary, the fluid torqued, dual tire assemblies 1002 and 1007 will compressively engage the pipeline so as to prevent rotation of these assemblies but will compressively engage the pipeline with such force as to be prevented from rotating. It will be understood, however, that even though stationary, the torqued dual tire assemblies will continuously exert spaced tensioning forces on the pipeline. This tension is maintained even while the vessel 5 is moving ahead during the pipe laying operation. Such movements of the vessel will cause rotation of the normally stationary, pipe tensioning dual tire assemblies 1002 and 1007. When such rotation occurs, the rotary motors 1022 and 1025 will merely function as pumps, in a manner well understood, and will maintain the predetermined pipe tension.

While a pipeline is being tensioned it may develop that a recessed pipeline portion, such as the section 1g shown in phantom line in FIGURE 15, may be disposed within the tensioning mechanism 10. As illustrated, the section 1g is a welded joint portion of a pipeline which is coated, except at such welded joints, with protective material such as cement. Portion 1g, which is annularly recessed, would not ordinarily be engaged by the dual tire assemblies. However, the remaining dual tire assemblies in the mechanism 10 will engage the pipeline and exert a sufficient tensioning force.

In the event that one or more of the dual tire assemblies should become damaged or otherwise inoperable as a result of the pipe laying operation, the remaining dual tire assemblies will remain operable so as to impose the desired tension on the pipeline 1. It will be understood, of course, that when one or more of the dual tire assemblies becomes damaged or inoperable it may become necessary to appropriately increase the pressure of hydraulic fluid supplied to the motors 1022 and 1025 and/or the hydraulic piston and cylinder assemblies 1011 and 1012.

ADVANTAGES AND SCOPE OF INVENTION

With the structure and mode of operation of the overall invention having been described, principal advantages of various aspects of the invention have been demonstrated.

The flexible, buoyant ramp for supporting a straight, inclined, and submerged section of a pipeline provides a uniquely effective mechanism for minimizing pipe stress and providing optimum and continuously effective pipe support along the length of the inclined and submerged straight pipe section. The longitudinal variations in buoyant lifting force which may be imparted by the ramp are particularly effective from the standpoint of overcoming pipe and ramp sagging.

The unitary structure of the ramp is such as to avoid structural and operational complexity and is such as to facilitate and simplify pipeline laying operations. Additionally, the unitary character of the ramp facilitates the ease with which the ramp and barge may be transported and assembled for pipe laying operations. While a barge is being moved from one operating site to another, the ramp may be detached from the connecting mechanism and transported on the barge or vessel itself.

The tensioning mechanism is particularly effective in that it provides means for continuously tensioning a pipe during pipe laying operations. In applying a series of longitudinally spaced, pipe tensioning forces, the tensioning mechanism is able to maintain an effective tensioning action regardless of the inoperable or ineffective character of one or more of the tensioning elements or irregularities in the pipeline periphery.

It is clear, in view of the preceding discussion, and the application drawings, including FIGURES 15, 16 and 17, that the peripheral portions $P_1$ and $P_2$ of the individual wheels of each dual tire assembly 1002 and 1007 peripherally engage the pipeline 1. This engagement by the portion $P_1$ and/or the portion $P_2$ shown for example in FIGURES 15 and 17 with reference to portion $P_1$, for purposes of conciseness and convenience of terminology, may be viewed as providing a pipeline support. This pipeline support may be viewed as being straight in that it involves engagement of the wheels with the straight pipeline portion 1a. The centrally located, longitudinal direction X of the pipeline support, as shown in FIGURES 15, 16 and 17, is parallel and coextensive with the central, longitudinally extending axis of the straight pipeline portion 1a engaged by the wheels of the dual tire assemblies 1002 and 1007. The longitudinal direction X extends in a direction $D_1$ generally away from the pipeline support as well as in an opposite axial direction $D_2$.

The continuously torqued nature of the wheels of the assemblies 1002 and 1007, previously discussed, insures that the peripheral portions P of the wheels, at their areas of engagement with a pipeline shown in FIGURE 15, tend to move generally in the direction $D_2$ of the tensioning forces imparted generally axially to the pipeline by the wheels. Further, the wheels, torqued in the tensioning direction are operable to impart axially applied forces to the pipeline while the straight portion of the pipeline engaged by the wheels is moving generally axially relative to this pipeline support in either of the opposite directions $D_1$ and $D_2$. The pipeline support provides a cradling or centering action where the dual pneumatic tire units tend to not only support, but inherently center, and thus stabilize, the straight portion of the pipeline engaged by the torqued wheels.

As described and illustrated, the mounting means such as columns 1017 and 1018 interconnect the wheel supporting frames and serve to position the wheel periphery defined, pipeline support in tension-controlling engagement with a pipeline depending generally downwardly from this support and into a body of water.

The resilient, compressible, and friction gripping characteristics of the pneumatic tires employed in the tensioning mechanism provide a highly effective, rugged, yet economical, pipeline tensioning arrangement. Additionally, the character of the dual pneumatic tire assemblies employed in the tensioning mechanism is such as to greatly facilitate repair operations when an assembly becomes damaged. Repairs may be effected with the ease with which a normal flat tire is repaired.

The connecting mechanism is uniquely advantageous in that it provides a rugged connecting structure in which the latching elements are housed or protected by interleaved mounting and retaining plates. The plurality of individually operable latching hooks provides a latching mechanism which is structurally rugged and which is effective even though one or more of the hooks become damaged.

The connecting mechanism is additionally advantageous in that it enables the elevation of the upper end of the ramp to be adjusted so as to provide optimum pipeline support and minimize pipeline stress. This adjustment may be effected from the vessel so as to promote operational efficiency and improve the safety of the pipeline laying operation.

The ability of the connecting mechanism to accommodate horizontal and vertical pivotal movement between the ramp and barge and to accommodate relative twisting movement between the ramp and barge minimizes the possibility of incurring damage to the equipment resulting from wave action.

The disposition of operating or control mechanisms at an elevated site from which the entire pipeline laying operation may be observed contributes to overall efficiency and safety in pipe laying operations and minimizes the number of operating personnel required.

The use of diverse inclination monitoring systems for the ramp provides significant advantages. This arrangement enables continuously effective monitoring even though wave action may temporarily interfere with the pressure responsive readings or submerged surface variations may interfere with the significance of the sonic readings.

Those skilled in the pipe laying art and familiar with the disclosure of this invention may recognize certain modifications which would fall within the purview of the invention. For example, the configuration and numbers of pontoons in the ramp may be varied from the arrangement described. The structural arrangement, configuration and numbers of components in the connecting mechanism may be varied.

In the tensioning mechanism, rotary pipe engaging members other than the pneumatic dual tire assemblies, might advantageously be employed. In addition, the orientation of the axes of rotation of the rotary members may be varied. For example, three dual tire assemblies could be employed to compressively engage generally opposite sides of the pipeline, with two such assemblies having mutually inclined axes of rotation so as to define a pipe cradling roller arrangement on the underside of the pipeline.

Modifications such as those suggested, as well as others, in addition to additions, deletions, or substitutions relating to the disclosed embodiments which would fall within the purview of the invention, are deemed to be encompassed by the appended claims.

I claim:

1. A method for selectively exerting axial force on a pipeline depending into a body of water, said method comprising:

disposing a pipeline portion between a first series of wheels and a second series of wheels;

moving the wheels of one series toward the other series of wheels so as to cause said first and second series of wheels to compressively engage said pipeline portion, with said compressive engagement being effected without deflecting said pipeline portion;

selectively imparting variable torque forces to at least some of the wheels of said first and second series spaced longitudinally of said pipeline portion to produce torqued wheels operable to impart a series of generally longitudinally spaced and longitudinally applied forces to said pipeline portion acting in the same general longitudinal direction, with said torque forces operating on said torqued wheels so as to tend to move peripheral portions of said torqued wheels which are engaged with said pipeline portion in the general direction of said longitudinally applied forces;

imparting said torque forces to said torqued wheels so as to cause said wheels to be operable to continuously impart generally longitudinally applied forces to said pipeline while said pipeline portion is moving generally longitudinally in either the general direction of said longitudinally applied forces or opposite thereto; and moving said pipeline generally longitudinally between said first and second series of wheels without deflecting said pipeline and while maintaining said compressive engagement and imparting said series of longitudinally spaced and longitudinally applied forces.

2. A method for selectively exerting axial force on a pipeline depending from a floating vessel into a body of water, said method comprising:

disposing a generally straight pipeline portion vertically between a first series of wheels and a second series of wheels carried by a floating vessel;

moving one series of wheels as a unit downward toward the other series of wheels so as to cause said first and second series of wheels to corpressively engage generally opposite sides of said generally straight pipeline portion;

selectively imparting variable torque forces to at least some of the wheels of said first and second series spaced longitudinally of said generally straight pipeline portion to produce torqued wheels operable to impart a series of generally longitudinally spaced and longitudinally applied forces to said generally straight portion of said pipeline acting in the same general longitudinal direction, with said torque forces operating on said torqued wheels so as to tend to move peripheral portions of said torqued wheels which are engaged with said pipeline in the general direction of said longitudinally applied forces; and imparting said selectively variable torque forces to said torqued wheels so as to cause said wheels to be operable to continuously impart generally longitudinally applied forces to said pipeline while said generally straight portion of said pipeline is moving generally longitudinally, without substantial deflection, in either the general direction of said longitudinally applied forces or opposite thereto.

3. A method for selectively exerting axial force on a pipeline depending from a floating vessel into a body of water, said method comprising:

disposing a generally straight pipeline portion vertically between a first series of wheels and a second series of wheels carried by a floating vessel;

moving one series of wheels as a unit downward toward the other series of wheels so as to cause said first and second series of wheels to compressively engage generally opposite sides of said generally straight pipeline portion;

selectively imparting variable torque forces to at least some of the wheels of said first and second series spaced longitudinally of said generally straight pipeline portion to produce torqued wheels operable to impart a series of generally longitudinally spaced and longitudinally applied forces to said generally straight portion of said pipeline acting in the same general longitudinal direction, with said torque forces operating on said torqued wheels so as to tend to move peripheral portions of said torqued wheels which are engaged with said pipeline in the general direction of said longitudinally applied forces;

imparting said selectively variable torque forces to said torqued wheels so as to cause said wheels to be operable to continuously impart generally longitudinally applied forces to said pipeline while said generally straight portion of said pipeline is moving, generally longitudinally, without substantial deflection, in either the general direction of said longitudinally applied forces or opposite thereto;

buoyantly and slidably supporting another portion of said pipeline depending from said first and second series of wheels, with said other portion being at least in part submerged;

from said floating vessel, monitoring the position of said buoyantly and slidably supported, other portion of said pipeline; and selectively adjusting buoyant lifting forces applied to said other portion in accordance with said monitoring.

4. A method for selectively exerting axial force on a pipeline depending from a floating vessel into a body of water, said method comprising:

disposing a generally straight pipeline portion vertically between a first series of wheels and a second series of wheels carried by a floating vessel;

moving one series of wheels as a unit downward toward the other series of wheels so as to cause said first and second series of wheels to compressively engage generally opposite sides of said generally straight pipeline portion;

engaging at least one side of said generally straight pipeline portion with one of said series of wheels so as to yieldably cradle said generally straight pipeline portion and impede lateral movement tendencies of said generally straight pipeline portion, with vertical separation of said first and second series of wheels providing a lateral opening extending the length of said first and second series of wheels, through which lateral opening said pipeline may move;

selectively imparting variable torque forces to at least some of the wheels of said first and second series spaced longitudinally of said generally straight pipeline portion to produce torqued wheels operable to impart a series of generally longitudinally spaced and longitudinally applied forces to said generally straight portion of said pipeline acting in the same general longitudinal direction, with said torque forces operating on said torqued wheels so as to tend to move peripheral portions of said torqued wheels which are engaged with said pipeline in the general direction of said longitudinally applied forces; and imparting said selectively variable torque forces to said torqued wheels so as to cause said wheels to be operable to continuously impart generally longitudinally applied forces to said pipeline while said generally straight portion of said pipeline is moving, generally longitudinally, without substantial deflection, in either the general direction of said longitudinally applied forces or opposite thereto.

5. A method for selectively exerting axial force on a pipeline depending from a floating vessel into a body of water, said method comprising:

disposing a generally straight pipeline portion vertically between a first series of wheels and a second series of wheels carried by a floating vessel;

moving one series of wheels as a unit downward toward the other series of wheels so as to cause said first and second series of wheels to compressively engage generally opposite sides of said generally straight pipeline portion;

engaging at least one side of said generally straight pipeline portion with one of said series of wheels so as to yieldably cradle said generally straight pipeline portion and impede lateral movement tendencies of said generally straight pipeline portion, with vertical separation of said first and second series of wheels providing a lateral opening extending the length of said first and second series of wheels, through which lateral opening said pipeline may move;

selectively imparting variable torque forces to at least some of the wheels of said first and second series spaced longitudinally of said generally straight pipeline portion to produce torqued wheels operable to impart a series of generally longitudinally spaced and longitudinally applied forces to said generally straight portion of said pipeline acting in the same general longitudinal direction, with said torque forces operating on said torqued wheels so as to tend to move peripheral portions of said torqued wheels which are engaged with said pipeline in the general direction of said longitudinally applied forces;

imparting said selectively variable torque forces to said torqued wheels so as to cause said wheels to be operable to continuously impart generally longitudinally applied forces to said pipeline while said generally straight portion of said pipeline is moving, generally longitudinally, without substantial deflection, in either the general direction of said longitudinally applied forces or opposite thereto;

buoyantly and slidably supporting another portion of said pipeline depending from said first and second series of wheels, with said other portion being at least in part submerged;

from said floating vessel, monitoring the position of said buoyantly and slidably supported, other portion of said pipeline; and selectively adjusting buoyant lifting forces applied to said other portion in accordance with said monitoring.

6. A method for selectively exerting pipeline tensioning force on a pipeline depending from a floating vessel into a body of water, said method comprising:

disposing a pipeline portion between first compressing means and second compressing means carried by a floating vessel;

generally converging said first compressing means with said second compressing means so as to cause said first and second compressing means to compressively engage said pipeline portion;

generating selectively variable torque force on said floating vessel;

yieldably transmitting said thus generated torque force to at least one of said first and second compressing means, and in response to said thus transmitted torque force, generating pipeline tensioning force which is imparted generally longitudinally of and to said pipeline portion through at least one of said compressing means, with said yieldably transmitted torque force operating on at least said one of said compressing means so as to bias a peripheral portion thereof engaged with said pipeline portion for movement relative to said floating vessel and in the general direction of said longitudinally applied tensioning force;

said torque force being transmitted to at least said one of said compressing means so as to cause at least said one of said first and second compressing means to be operable to continuously impart said pipeline tensioning force to said pipeline while said pipeline portion is stationary relative to said floating vessel and while said pipeline portion is moving relative to said floating vessel in either the general direction of said longitudinally applied tensioning force or a direction opposite thereto;

moving said floating vessel generally away from a submerged location of said pipeline while said peripheral portion of said one of said first and second compressing means is moving relative to said floating vessel in said opposite direction and while pipeline tensioning force generated in response to said torque force is being continuously imparted therethrough to said pipeline portion;

said peripheral portion of said one of said first and second compressing means being movable relative to said floating vessel in said general direction of said longitudinally applied tensioning force while pipeline tensioning force generated in response to said torque force is being continuously imparted therethrough to said pipeline portion; and said peripheral portion of said one of said first and second compressing means being operable to continuously impart said tensioning force generated in response to said torque force to said pipeline portion while said pipeline portion is stationary relative to said floating vessel.

7. A method as described in claim 6:

wherein said torque force is generated by pressurized hydraulic fluid;

wherein said pressurized hydraulic fluid is vented to permit said moving of said peripheral portion of said one of said first and second compressing means relative to said floating vessel in said opposite direction while pipeline tensioning force generated in response to said torque force is being continuously imparted therethrough to said pipeline portion;

wherein said first and second compressing means are defined by a plurality of wheels spaced longitudinally of said pipeline portion and operable to apply a series of tensioning forces to said pipeline, spaced longitudinally along said pipeline portion; and wherein said first and second compressing means cradle said pipeline portion to impede movement thereof transversely of said general direction of said longitudinally applied tensioning force.

References Cited

UNITED STATES PATENTS

| | | | |
|---|---|---|---|
| 3,214,921 | 11/1965 | Goepfert et al. | 61—72.3 |
| 3,273,346 | 9/1966 | Delaruelle et al. | 61—72.3 |
| 3,280,571 | 10/1966 | Hauber et al. | 61—72.1 |
| 3,390,532 | 7/1968 | Lawrence | 61—72.3 |
| 3,372,461 | 3/1960 | Tesson | 61—72.3 X |

JACOB SHAPIRO, Primary Examiner

U.S. Cl. X.R.

226—128

UNITED STATES PATENT OFFICE
CERTIFICATE OF CORRECTION

PO-1050
(5/69)

Patent No. 3,487,648      Dated January 6, 1970

Inventor(s) Joseph Benton Lawrence

It is certified that error appears in the above-identified patent and that said Letters Patent are hereby corrected as shown below:

In column 3, line 37, "6" should be -- 16 -- .
In column 6, line 3, "main" should be -- maintain -- .

In column 10, line 10, "buoyancy" should be -- buoyantly -- .
In column 10, lines 12 and 13, "upwards" should be -- upwardly -- .
In column 14, line 62, "butment" should be -- abutment -- .
In column 14, line 66, "MECHANIM" should be -- MECHANISM -- .
In column 16, line 67, "motor" should be -- motors -- .
In column 16, line 71, "Flow" should be -- Low -- .
In column 17, line 67, after "have" the word "not" should be inserted.
In column 18, line 4, "102" should be -- 1002 -- .
In column 21, line 41, "corpressively" should be -- compressively -- .
In column 24, line 50, "portion" should be -- portions -- .

SIGNED AND
SEALED
JUN 23 1970

(SEAL)
Attest:

Edward M. Fletcher, Jr.
Attesting Officer

WILLIAM E. SCHUYLER, JR.
Commissioner of Patents